(12) United States Patent
Wu et al.

(10) Patent No.: US 6,563,997 B1
(45) Date of Patent: May 13, 2003

(54) FORMATION OF A SURFACE ON AN OPTICAL COMPONENT

(75) Inventors: Chi Wu, San Marino, CA (US); Xiaoming Yin, Pasadena, CA (US)

(73) Assignee: Lighteross, Inc., Monterey Park, CA (US)

( * ) Notice: Subject to any disclaimer, the term of this patent is extended or adjusted under 35 U.S.C. 154(b) by 141 days.

(21) Appl. No.: 09/723,757

(22) Filed: Nov. 28, 2000

(51) Int. Cl.$^7$ .............................. G02B 6/10; H01L 21/00
(52) U.S. Cl. ...................... 385/130; 385/129; 385/131; 385/132; 385/14; 438/31; 438/29; 438/69
(58) Field of Search ................................. 385/129, 130, 385/131, 132, 14, 141; 438/31, 69, 29

(56) References Cited

U.S. PATENT DOCUMENTS

| | | | |
|---|---|---|---|
| 4,618,210 A | 10/1986 | Kondo | 385/16 X |
| 4,747,654 A | 5/1988 | Yi-Yan | 385/37 X |
| 4,813,757 A | 3/1989 | Sakano et al. | 385/14 X |
| 4,846,542 A | 7/1989 | Okayama | 385/16 X |
| 5,002,350 A | 3/1991 | Dragone | 385/37 X |
| 5,013,113 A | 5/1991 | Soref | 385/15 X |
| 5,039,993 A | 8/1991 | Dragone | 343/776 |
| 5,182,787 A * | 1/1993 | Blonder et al. | 385/130 |
| 5,243,672 A | 9/1993 | Dragone | 385/46 |
| 5,253,319 A | 10/1993 | Bhagavatula | 385/129 |
| 5,263,111 A * | 11/1993 | Nurse et al. | 385/130 |
| 5,391,869 A * | 2/1995 | Ade et al. | 250/227.24 |
| 5,412,744 A | 5/1995 | Dragone | 385/24 |
| 5,450,511 A | 9/1995 | Dragone | 385/37 |
| 5,467,418 A | 11/1995 | Dragone | 385/37 |
| 5,581,643 A | 12/1996 | Wu | 385/17 |
| 5,706,374 A * | 1/1998 | Vinchant | 385/16 |
| 5,706,377 A | 1/1998 | Li | 385/37 |
| 5,786,925 A * | 7/1998 | Goossen et al. | 359/245 |
| 5,841,931 A | 11/1998 | Foresi et al. | 385/131 |
| 5,938,811 A | 8/1999 | Greene | 65/385 |
| 6,108,478 A | 8/2000 | Harpon et al. | 385/129 |
| 6,118,909 A | 9/2000 | Chen et al. | 385/15 |

FOREIGN PATENT DOCUMENTS

| | | | |
|---|---|---|---|
| EP | 0647861 A1 | 4/1995 | 385/37 X |
| EP | 0985942 A2 | 3/2000 | 385/37 X |
| JP | 63-197923 | 8/1988 | 385/16 X |
| JP | 2-179621 | 7/1990 | 383/16 X |
| JP | 6-186598 | 7/1994 | 385/16 X |

OTHER PUBLICATIONS

Ahmad, et al., *Ultracompact Corner–Mirrors and T–Branches in Silicon–on–Insulator*, IEEE Photonics Technology Letters, vol. 14, No. 1, Jan. 2002, pp. 65–67.

Appleman, et al., *Self–Aligned Chemically Assisted Ion–Beam–Etched GaAs/(Al,Ga)As Turning Mirrors for Photonic Applications*, Journal of Lightwave TEchnology, vol. 8, No. 1, Jan. 1990, pp. 39–41.

Faustini, et al, Loss Analysis and Interference Effect in Semiconductor Integrated Waveguide Turning Mirrors, IEEE Photonics Technology Letters, vol. 8, No. 10, Oct. 1996, pp. 1355–1357.

(List continued on next page.)

*Primary Examiner*—Brian Healy
(74) *Attorney, Agent, or Firm*—Law Offices of Travis Dodd P.S.

(57) ABSTRACT

A method of forming a reflecting surface on an optical component is disclosed. The method includes forming a first mask so as to protect a ridge region of a light transmitting medium. The ridge region is a region where a ridge of a waveguide will be formed. The method also includes performing a first etch of the light transmitting medium so as to form a side of the ridge. The first mask defines a profile of the side of the ridge during the first etch. The method further includes performing a second etch of the light transmitting medium so as to form the reflecting surface. The first mask defines a profile of the reflecting surface during the second etch.

23 Claims, 16 Drawing Sheets

OTHER PUBLICATIONS

Johnson, et al, *Precise Determination of Turning Mirror Loss Using GaAs/AIGaAs Lasers with Up to Ten 90° Intracavity Turning Mirrors*, IEEE Photonics Technology Letters, vol. 4, No. 1, Jan. 1992, pp. 24–26.

Pennings, et al., *Integrated–Optic Versus Microoptic Devices for Fiber–Optic Telecommunication Systems: A Comparison*, IEEE Journal of Selected Topics in Quantum Electronics, vol. 2, No. 2, Jun. 1996, pp. 151–164.

Studenkov, et al., *Efficient Coupling in Integrated Twin–Waveguide Lasers Using Waveguide Tapers*, IEEE Photonics Technology Letters, vol. 11, No. 9, Jan. 1999, pp. 1096–1098.

Tang, et al., *Integrated Waveguide Turning Mirror in Silicon–on–Insulator*, IEEE Photonics Technology Letters, vol. 14, No. 1, Jan. 2002, pp. 68–70.

Abe, et al., *Optical Path Length Trimming Technique using Thin Film Heaters for Silica–Based Waveguides on Si*, Electronics Letters, Sep. 12, 1996, vol. 32–No. 19, pp. 1818–1820.

Albert, J., *Planar Fresnel Lens Photoimprinted in a Germanium–Doped Silica Optical Waveguide*, Optics Letters, May 15, 1995, vol. 20–No. 10, pp. 1136–1138.

Aman, M.C., *Calculation of Metal–Clad Ridge–Waveguide (MCRW) Laser Modes by Mode Coupling Technique*, Journal of Lightwave Technology, vol. LT–4, No. 6, Jun. 1986, pp. 689–693.

Amann, M.C. et al, *Calculation Of The Effective Refractive–Index Step For The Metal–Cladded–Ridge–Waveguide Laser*, Applied Optics, vol. 20, No. 8, Apr. 15, 1981, pp. 1483–1486.

Baba, S. et al., *A Novel Integrated–Twin–Guide (ITG) Optical Switch with a Built–in TIR Region*; IEEE Photonics Technology Letters; vol. 4, No. 5, May 1992, pp. 486–488.

Benson, T.M., *Etched–Wall Bent–Guide Structure for Integrated Optics in the III–V Semiconductors*; Journal of Lightwave Technology, vol. LT–2, No. 1, Feb. 1984; pp. 31–34.

Berry, G.M. et al., *Analysis Of Multiplayer Semiconductor Rib Waveguides With High Refractive Index Substrates*, Electronics Letters; vol. 29, No. 22; Oct. 28, 1993, pp. 1941–1942.

Betty, I. et al., *A Robust, Low–Crosstalk, InGaAsP/InP Total–Internal Reflection Switch For Optical Cross–Connect Application*.

Burke, S.V., *Spectral Index Method Applied to Coupled Rib Waveguides*; Electronics Letters, vol. 25, No. 9, Apr. 27, 1989, pp. 605–606.

Burns, W.K. et al., *Mode Conversion in Planar–Dielectric Separating Waveguides*; IEEE Journal of Quantum Electronics, vol. QE–11, No. 1, Jan. 1975; pp. 32–39.

Cai, Y. et al., *A Novel Three–Guide Optical Coupler Using A Taper–Formed Waveguide*; j. Appl. Phys 69(5), Mar. 1991; pp. 2810–2814.

Cavailles, J.A. et al., *First Digital Optical Switch Based on InP/GaInAsP Double Heterostructure Waveguides*; Electronics Letters, vol. 27, No. 9, Apr. 25, 1991, pp. 699–700.

Chen, R.T. et al., *Design and Manufacturing of WDM Devices*; Proceedings of SPIE vol. 3234.

Clemens, et al., *Wavelength–Adaptable Optical Phased Array in $SiO_2$–Si*, Photonics Technology Letters, Oct. 1995, vol. 7–No. 10, 1040–1041.

Dagli, N. et al., *Analysis of Rib Dielectric Waveguides*; IEEE Journal of Quantum Electronics, vol. QE–21, No. 4, Apr. 1985, pp. 315–321.

Dagli, N. et al., *Theoretical and Experimental Study of the Analysis and Modeling of Integrated Optical Components*; IEEE Journal of Quantum electronics, vol. 24, No. 11, Nov. 1988; pp. 2215–2226.

Deri, R.J., et al., *Low–Loss GaAs/AIGaAs Waveguide Phase Modulator Using A W– Shaped Index Profile*; Sep. 6, 1988.

Deri, R.J., et al., *Low–Loss Multiple Quantum Well GaInAs/InP Optical Waveguides*; Feb. 21, 1989.

Devaux, F. et al., *20Gbit/s Operation of a High–Efficiency InGaAsP/InGaAsP MQW Electroabsorption Modulator With 1.2–V Drive Voltage*; IEEE Photonics Technology Letters, vol. 5, No. 11, Nov. 1993, pp. 1288–1290.

Doerr, C.R. et al., *Chirping Of The Waveguide Grating Router For Free–Sprectral–Range Mode Selection In The Multifrequency Laser*, IEEE Photonics Technology Letters, Apr. 1996, vol. 8–No. 4, pp. 500–502.

Doerr, C.R. et al., *Chromatic Focal lane Displacement in the Parabolic Chirped Waveguide Grating Router*; May 1997, vol. 9–No. 5, pp 625–627.

Dragone, c. *Efficient NxN Star Couplers Using Fourier Optics*, pp. 479–48, Mar. 1989, vol. 7–No. 3, Journal of Lightwave Technology.

Fischer, et al., *Singlemode Optical Switches Based on SOI Waveguides with Large Cross–Section*, Electronics Letters, Mar. 3, 1994, vol. 30–No. 5, pp. 406–408.

Fischer, K. et al, *Sensor Application Of SiON Integrated Optical Waveguides On Silicon*; Elsevier Sequoia, 1992; pp. 209–213.

Fish, G. et al., *Monolithic InP Optical Crossconnects: 4×4 and Beyond*, JWB2–1, pp. 19–21.

Furuta, H. et al, *Novel Optical Waveguide For Integrated Optics*, Applied Optics, vol. 13, No. 2, Feb. 1974, pp. 322–326.

Gini, E. et al., *Low Loss Self–Aligned Optical Waveguide Corner Mirrors in InGaAsP/InP*, We P2.22.

Goel, K. et al *Design Considerations for Low Switching Voltage Crossing Channel Switches*; Journal of Lightwave Technology, vol. 6, No. 6, Jun. 1988, pp. 881–886.

Granestrand, P. et al., *Integrated Optics 4×4 Switch Matrix with Digital Optical Switches*; Electronics Letters, vol. 26, No. 1, Jan. 4, 1990; pp. 4–5.

Himeno, A. et al., *Loss Measurement and Analysis of High–Silica Reflection Bending Optical Waveguides*, Journal of Lightwave Technology, Jan. 1988, vol. 6–No. 1, 41–46.

Hsu, K.Y. et al., *Photonics devices and Modules*, www.c-c.nctu.edu.tw/~ctr/lee_mti/research_topic/photonic_devices_modules.htm, pp. 1–3.

Huang, T.C. et al., *Depletion Edge Translation Waveguide Crossing Optical Switch*; IEEE Photonics Technology Letters; vol. 1, No. 7, Jul. 1989, pp. 168–170.

Hutcheson, L.D. et al., *Comparison of Bending Losses in Integrated Optical Circuits*; Optics Letters, vol. 5, No. 6, Jun. 1980, pp. 360–362.

Inoue, H. et al, *Low Loss GaAs Optical Waveguides*, Journal of Lightwave Technology, vol. LT–3, No. 6, Dec. 1985; pp. 204–209.

Irace, A. et al., *Fast Silicon–on–Silicon Optoelectric Router Based on a BMFET Device*, Journal of Selected Topics in Quantum Electronics, Jan./Feb. 2000, vol. 6–No. 1, pp. 14–18.

Ito, F. et al., *Carrier–Injection–Type Optical Switch In GaAs With A 1.06–1.55 μm Wavelength Range*; Appl. Physics Letters, 54(2) Jan. 9, 1989; pp. 134–136.

Jackman, N. et al., *Optical Cross Connects for Optical Networking*; Bell Labs Technical Journal, Jan.–Mar. 1999; pp. 262–281.

Johnston, I.R., et al., *Silicon–Based Fabrication Process For Production Of Optical Waveguides*; IEE Proc–Optoelectron., vol. 143, No. 1, Feb. 1996, pp. 37–40.

Kaenko, A. et al., *Athermal Silica–based Arrayed–waveguide Grating (AWG) Multiplexers with New Low Loss Groove Design*; TuO1–1, pp. 204–206.

Kasahara, R. et al., *Low–Power Consumption Slica–Based 2×2 Thermooptic Switch Using Trenched Silicon Substrate*, IEEE Photonics Technology Letters, vol. 11, No. 9, Sep. 1999, pp. 1132–1134.

Khan, M.N. et al., *Fabrication–Tolerant, Low–Loss, and High–Speed Digital Optical Switches in InGaAsP/InP Quantum Wells*; Proc $21^{st}$ Eur.Conf.on Opt.Comm.(ECOC '95–Brussels), pp. 103–106.

Khan, M.N. et al., *High–Speed Operation of Quantum Well Electron Transfer Digital Optical Switches*; pp. 102–102c.

Kirihara, T. et al., *Lossless And Low Crosstalk 4×4 Optical Switch Array; Electronics And Communications In Japan*, Part 2, vol. 77, No. 11, 1994, pp. 73–81.

Kirihara, T. et al., *Lossless and Low–Crosstalk Characteristics in an InP–Based 2×2 Optical Switch*, IEEE Photonics Technology Letters, vol. 5, No. 9 Sep. 1993, p. 1059–1061.

Kokubun, Y. et al., *Athermal Waveguides for Temperature–Independent Lightwave Devices*, Nov. 1993, 1297–1298, vol. 5–No. 11, IEEE Photonics Technology Letters.

Kokubun, Y. et al., *Temperature–Independent Narrowband Optical Filter at 1.3 μm Wavelength by an Athermal Waveguide*, $10^{th}$ Oct. 1996, vol. 32–No. 21, Electronics Letters.

Kokubun, Y. et al., *Temperature–Independent Optical Filter at 1.55μm Waveguide Using a Silica–Based Athemal Waveguide*, Feb. 19, 1998, vol. 34–No. 4, Electronics Letters.

Kokubun, Y. et al., *Three–Dimensional Athermal Waveguides for Temperature Independent Lightwave Devices*, $21^{st}$ Jul. 1994, vol. 30–No. 15, Electronics Letters.

Kostrzewa, C. et al., *Tunable Polymer Optical Add/Drop Filter for Multiwavelength Networks*, Photonics Technology Letters, Nov. 1997, vol. 9–No. 11, 1487–1489.

Laakman, K. D. et al., *Waveguides: Characteristic Modes Of Hollow Rectangular Dielectric Waveguides*; Applied Optics, vol. 15, No. 5, May 1976; pp. 1334–1340.

Lee, T.P. et al., $Al_x$ $Ga_{1-x}$ *As Double–Heterostructure Rib–Waveguide Injection Laser*; IEEE Journal of Quantum Electronics; vol. QE–11, No. 7, Jul. 1975; pp. 432–435.

Liu, Y.L. et al., *Silicon 1×2 Digital Optical Switch Using Plasma Dispersion*; Electronics Letters, vol. 30, No. 2, Jan. 20, 1994; pp. 130–131.

Mak, G. et al., *High–Speed Bulk InGaAsP–InP Electroabsorption Modulators with Bandwidth in Excess of 20 GHz*, IEEE Photonics Technology Letter, vol. 2, No. 10, Oct. 1990, pp. 730–733.

Marcatili, E., *Improved Coupled–Mode Equations for Dielectric Guides*; IEEE Journal of Quantum Electronics, vol. QE–22, No. 6, Jun. 1986; pp. 988–993.

Marcatili, E.A.J., *Bends in Optical Dielectric Guides*; The Bell System Technical Journal, Sep. 1969; pp. 2103–2132.

Marcatili, E.A.J., *Dielectric Rectangular Waveguide and Directional Coupler for Integrated Optics*, The Bell System Technical Journal, Sep. 1969 pp. 2071–2101.

Marcatili, E.A.J., *Slab–Coupled Waveguides*; The Bell System Technical Journal, Apr. 1974; American Telephone & Telegraph Company, vol. 53, No. 4, Apr. 1974.

Mirza, A.R. et al, *Silicon Wafer Bonding For MEMS Manufacturing*, Solid State Technology, Aug. 1999, pp. 73–78.

Moerman, I. et al., *A Review on Fabrication Technologies for the Monolithic Integration of Tapers with III–V Semiconductor Devices*; IEEE Journal of Selected Topics in Quantum electronics, vol. 3, No. 6, Dec. 1997, pp. 1308–1320.

Müller, G. et al., *First Low Loss InP/InGaAsP Optical Switch with Integrated Mode Transformers*; ThC12.10; pp. 37–40.

Nayyer, J. et al., *Analysis of Reflection–Type Optical Switches with Intersecting Waveguides*, Journal of Lightwave Technology, vol. 6, No. 6, Jun. 1988; pp. 1146–1152.

Negami, t. et al., *Guided–Wave Optical Wavelength Demultiplexer Using An Asymmetric Y Junction*; Appl. Phys. Lett. 54 (12), Mar. 20, 1989; p. 1080–1082.

Nelson, W. et al., *Optical Switching Expands Communications–Network Capacity*; Laser Focus World, Jun. 1994, pp. 517–520.

Nelson, W.H. et al., *Wavelength–and Polarization–Independent Large Angle InP/InGaAsP Digital Optical Switches with Extinction Ratios Exceeding 20 dB*; IEEE Photonics Technology Letters, vol. 6, No. 11, Nov. 1994; pp. 1332–1334.

Noda, Y. et al., *High–Speed Electroabsorption Modulator with Strip–Loaded GaInAsP Planar Waveguide*; Journal of Lightwave Technology, vol. LT–4, No. 10, Oct. 1986, pp. 1445–1453.

Offrien, B.J. et al., *Resonant Coupler–Based Tunable Add–After–Drop Filter in Silicon–Oxynitride Technology for WDM Networks*, Journal of Selected Topics in Quantum Electronics, vol. 5–No. 5, 1400–1405.

Okamoto, K. et al., *Arrayed–Waveguide Grating Multiplexer With Flat Spectral Response*; Optics Letters, Jan. 1, 1995; vol. 20, No. 1; pp. 43–45.

Okamoto, K. et al., *Flat Spectreal Response Arrayed–Waveguide Grating Multiplexer with Parabolic Waveguide Horns*, Electronics Letters Online, Jul. 15, 1996, No. 19961120, pp. 1661–1662.

Okayama, H. et al., *8×8 Ti:LiNbO₃ Waveguide Digital Optical Switch Matrix*; IEICE Trans. Commun.; vol. E77–B, No. 2; Feb. 1944; pp. 204–208.

Okayama, H. et al., *Dynamic Wavelength Selective Add/Drop Node Comprising Tunable Gratings, Electronics Letters Online*, Apr. 10, 1997, No. 19970607.

Okayama, H. et al., *Reduction of Voltage–Length Product for Y–Branch Digital Optical Switch*, Journal of Lightwave Technology, vol. 11, No. 2, Feb. 1993; pp. 379–387.

Okuno, M. et al., *Strictly Nonblocking 16×16 Matrix Switch Using Silica Based Planar Lightwave Circuits*, vol. 10, No. 266, Sep. 11, 1986.

Ooba, N. et al., *Athermal Silica–Based Arrayed–Waveguide Grating Multiplexer Using Bimetal Plate Temperature Compensator*, Electronics Letters, Oct. 12, 2000, vol. 36, No. 21, pp. 1800–1801.

Renaud, M. et al, *Compact Digital Optical Switches for Low Insertion Loss Large Switch Arrays on InP*; Proc. 21$^{st}$ Eur.Conf.on Opt. Comm. (ECOC '95–Brussels), pp. 99–102.

Rickamn, A.G. et al., *Silicon–on–Insulator Optical Rib Waveguide Loss and Mode Characteristics*, Journal of Lightwave Technology, Oct. 1994, vol. 12–No. 10, pp. 1771–1776.

Rolland, C. et al., *10 Gbit/s, 1.56 μm, Multiquantum Well InP/InGaAsP Mach–Zehnder Optical Modulator*; Electronics Letters, Mar. 4, 1993, vol. 29, No. 5, pp. 471–472.

Santec Sales Brochure for year 2000 entitled "Optical Components".

Schauwecker, B. et al, *Small–Size Silicon–Oxynitride AWG Demultiplexer Operating Around 725 nm*, IEEE Photonics Technology Letters, vol. 12 No. 12, Dec. 2000.

Schlachetzki, A. *Monolithic IO–Technology–Modulators and Switches Based on InP*; SPIE vol. 651 Integrated Optical Circuit Engineering III (1986), pp. 60–86.

Silberberg, Y. et al., *Digital Optical Switch*; Appl. Phys. Lett.; vol. 51, No. 16, Oct. 19, 1987, pp. 152–154.

Smit, M.K. *New Focusing and Dispersive Planar Component Based on an Optical Phased Array*; Electronics Letters; Mar. 31, 1998, vol. 24, No. 7; pp. 385–386.

Smith, S.D. et al., *CW Operation of Corner Cavity Semiconductor Lasers*; IEEE Photonics Technology Letters, vol. 5, No. 8, Aug. 1993; pp. 876–879.

Sneh, A. et al., *Compact Low Crosstalk and Low Propagation Loss Quantum–Well Y–Branch Switches*; PDP 4–1–4–5.

Soole, J.B.D. et al., *Use of Multimode Interference Couplers to Broaden the Passband of Wavelength–Dispersive Integrated WDM Filters*; IEEE Photonics Technology Letters, vol. 8, No. 10, Oct. 1996; pp. 1340–1342.

Stoll, L. et al., *1:8 Optical Matrix Switch on InP/InGaAsP with Integrated Mode Transformers*; Optical Switches and Modulators II, pp. 531–534.

Stoll, L. et al., Compact and Polarization Independent Optical Switch on InP/InGaAsP; TuB7.2; pp. 337–340.

Stutius, W. et al, *Silicon Nitride Films On Silicon For Optical Waveguides*, Applied Optics, vol. 16, No. 12, Dec. 1977, pp. 303–307.

Sugie, T. et al., *1.3μm Laser Diodes with a Butt–jointed Selectively Grown Spot–Size Converer*; ThB2–6, IOOOC95, pp. 52–53.

Tada, K. et al., *Bipolar Transistor Carrier–Injected Optical Modulator/Switch; Proposal and Analysis*, IEEE Electron Device Letters, vol. EDL–7, No. 11, Nov. 1986, pp. 605–606.

Takada, et al., *Optical Spectrum analyzer using Cascaded AWG's with Different Channel Spacings*, Photonics Technology Letters, Jul. 1999, vol. 11, No. 7, pp. 863–864.

Takahashi, H. et al., *Arrayed Waveguide Grating for Wavelength Division Multi/Demultilexer with Nonometre Resolution*, PWG–NTT–7.

Takiguchi, K. et al, *Dispersion Compensation Using a Planar Lightwave Circuit Optical Equalizer*, Photonics Technology Letters, Apr. 1994, vol. 6, No. 4, pp. 561–564.

Tien, P.K. et al., *Formation of Light–Guiding Interconnections in an Integrated Optical Circuit by Composite Tapered–Film Coupling*; Applied Optics, vol. 12, No. 8, Aug. 1973; pp. 1909–1916.

Toyoda et al., *Thermoplastic Switch and Wavelength Tunable Filter using Polymer Waveguides*, Abstract of paper presented at Opticomm 2001 on Aug. 22, 2001.

Treyz, G.V. et al., *Silicon Optical Modulators at 1.3 μm Based on Free–Carrier Absorption*; IEEE Electron Device Letters, vol. 12, No. 6, Jun. 1991; pp. 276–278.

Tsuda, H. et al., *Performance Analysis of a Dispersion Compensator Using Arrayed–Waveguide Gratings*, Journal of Lightwave Technology, Aug. 2000, vol. 18–No. 8, pp. 1139–1147.

Tsude, H. et al., *Second– and Third–Order Dispersion Compensator Using a High–Resolution Arrayed Waveguide Grating*, IEEE Photonics Technology Letters, May 1999, vol. 11–No. 5, 569–571.

Vinchant et al, *InP 4×4 Digital–Optical–Switch Module For Multiwavelength Cross–Connect Applications*; OFC '95 Technical Digest, Thursday ThK2, pp. 281–282.

Vinchant, J.F. et al., *First Polarisation insensitive 4×4 Switch matrix on InP with Digital Optical Switches*, TuB7.3, pp. 341–344.

Vinchant, J.F. et al., *InP Digital Optical Switch: Key Element for Guided– Wave Photonic Switching*; IEE Proceedings–J, vol. 140, No. 5, Oct. 1993; pp. 301–307.

Vinchant, J.F. et al., *Low Driving Voltage or Current Digital Optical Switch on InP for Multiwavelength System Applications*; Electronics Letters, vol. 28, No. 12, Jun. 4, 1992; pp. 1135–1137.

Wakita, K. et al., *Long Wavelength Waveguide Multiple Quantum Well Optical Modulators*; IEEE Journal of Quantum Electronics, vol. QE–23, No. 12, Dec. 1987, pp. 2210–2215.

Wanru, Z. et al., *Total Internal Reflection Optical Switch with Injection Region Isolated by Oxygen Ion Implantation*; pp. 1–10.

Yamada, et al., *Cross Talk Reduction in a 10 GHz Spacing Arrayed–Waveguide Grating by Phase–Error Compensation*, Journal of Lightwave Technology, Mar. 1998, vol. 16–No. 3, pp. 364–371.

Yanagawa, H. et al., *Polarization–and Wavelength–Insensitive Guided–Wave Optical Switch with Semiconductor Y Junction*; Junction; Journal of Lightwave Technology, vol. 8, No. 8, Aug. 1990, pp. 1192–1197.

Yu S. et al., *High Speed All–Optical Packet Routing Using A Vertical Coupler Crosspoint Space Switch*.

Yu, S. et al., *Ultralow Cross–Talk, compact integrated optical crosspoint space switch arrays employing active InGaAsP/InP Vertical Waveguide Couplers*, Integrated Optical Crosspoint Switch Arrays, Siyuan Yu et a, CPD24–2.

Zengerle, R. et al., *Tapered Twin Waveguides For Spot–Size Transformation In InP*; TheB2–5; IOOC 95; pp. 50–51.

Zirngibl, M. et al., *Digitally Tunable Laser Based On The Integration Of A Wavegide Grating Multiplexer And An Optical Amplifier*, IEEE Photonics Technology Letters, Apr. 1994, vol. 6–No. 4, pp. 516–517.

Zucker, J.E. et al., *Strained Quantum Wells for Polarization–Independent Electrooptic Waveguide Switches*, Journal of Lightwave Technology, vol. 10, No. 12, Dec. 1992, pp. 1926–1930.

\* cited by examiner

FORMATION OF A SURFACE ON AN OPTICAL COMPONENT

RELATED APPLICATIONS

This application is related to U.S. patent application Ser. No. 09/724,175, filed concurrently herewith and entitled "A COMPACT INTEGRATED OPTICS BASED ARRAYED WAVEGUIDE DEMULTIPLEXER" and U.S. patent application Ser. No. 09/724,173, pending, filed concurrently herewith and entitled "DEMULTIPLEXER HAVING A COMPACT LIGHT DISTRIBUTOR" each of which is incorporated herein in its entirety.

BACKGROUND

1. Field of the Invention

The invention relates to one or more optical networking components. In particular, the invention relates to optical components having a reflecting surface.

2. Background of the Invention

Many optical components include one or more surfaces where light signals are reflected. For instance, many optical components include waveguides that intersect. A reflecting surface is often formed at the intersection for reflecting light signals from one waveguide into the other waveguide. The position and profile of the reflecting surface relative to the waveguides should be precise in order to ensure reflection of the light signals in the desired direction.

A reflecting surface, at the intersection of the waveguides is often formed by performing two sequential mask and etch steps. The limitations of photolithography mask printing equipment prevents precise alignment of two sequentially formed masks. As a result, the portion of the reflecting surface formed during the first etch is often not aligned with the portion of the reflecting surface formed during the second etch. Accordingly, the portion of the reflecting surface formed during the first etch has a different position relative to the waveguides than does the portion of the reflecting surface formed during the second etch. The inconsistent positioning of the reflecting surface reduces the performance quality of the optical component.

For the above reasons, there is a need for a component having a reflecting surface with an accurate position relative to the waveguides.

SUMMARY OF THE INVENTION

The invention relates to a method of forming an optical component. The method includes forming a first mask so as to protect a ridge region of a light transmitting medium. The ridge region is a region of the light transmitting medium a region where a ridge of a waveguide will be formed. The method also includes performing a first etch of the light transmitting medium so as to form a first side of the ridge. The first mask serves to define a profile of the first side of the ridge during the first etch. The method further includes performing a second etch of the light transmitting medium so as to form a second side of the ridge. The first mask also serves to define a profile of the second side of the ridge during the second etch. In some instances, the second side is formed so as to have a different height than the first side.

The invention also relates to a method of forming a reflecting surface on an optical component. The method includes forming a first mask so as to protect a ridge region of a light transmitting medium. The ridge region is a region where a ridge of a waveguide will be formed. The method also includes performing a first etch of the light transmitting medium so as to form a side of the ridge. The first mask defines a profile of the side of the ridge during the first etch. The method further includes performing a second etch of the light transmitting medium so as to form the reflecting surface. The first mask defines a profile of the reflecting surface during the second etch.

In one embodiment of the invention, the second etch is performed before the first etch.

In another embodiment of the invention, the second etch is performed more deeply than the first etch. Accordingly, the reflecting surface is taller than the side of the ridge.

DETAILED DESCRIPTION OF THE PREFERRED EMBODIMENT

The invention relates to a method of forming waveguide including sides having different heights. The method includes providing an optical component having a light transmitting medium. The method includes forming a first mask so as to protect a ridge region of the light transmitting medium. The ridge region is a region where a ridge of a waveguide will be formed. The method also includes performing a first etch of the light transmitting medium so as to form a first side of the ridge. The first mask serves to define a profile of the first side during the first etch. The method also includes performing a second etch of the light transmitting medium so as to form a second side of the ridge. The first mask serves to define a profile of the second side during the second etch.

Because the second side is formed in a different step than the first side, the second side can be formed with a different height than the first side. Additionally, the entire first side can be formed during the first etch and the entire second side can be formed during the second etch. In one embodiment of the invention, the second side is a reflecting surface. As a result, an entire reflecting surface can be formed during a single etch and the need to align sequentially formed masks is eliminated. Without the need to align sequentially formed masks, a reflecting surface can be formed with a consistent and precise position relative to the waveguide.

Figure 1A:
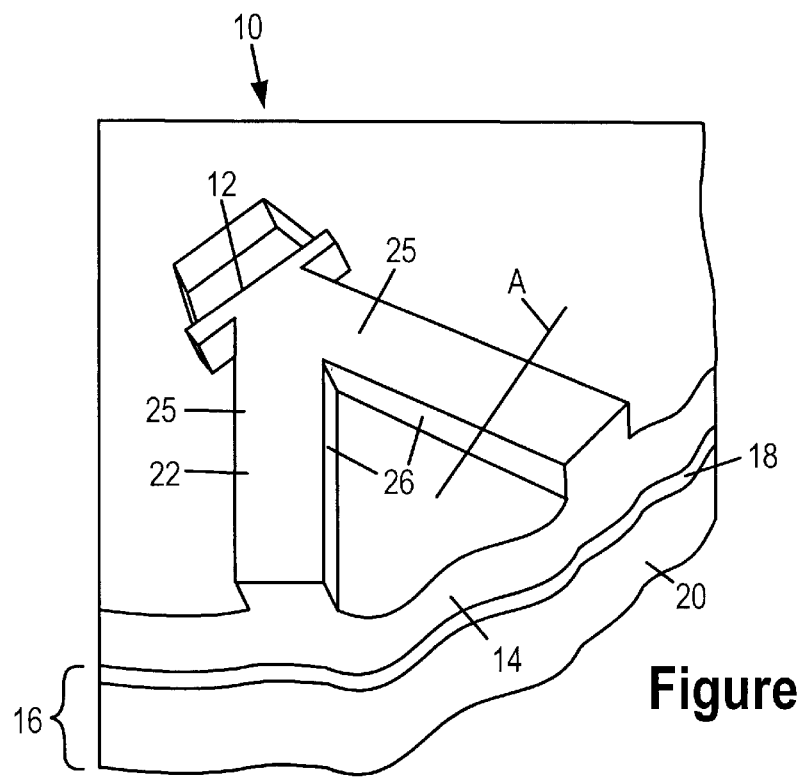
FIG. 1A is a perspective view of an optical component having a light transmitting medium formed over a base. The optical component includes a reflecting surface positioned at the intersection of two waveguides.
Figure 1B:
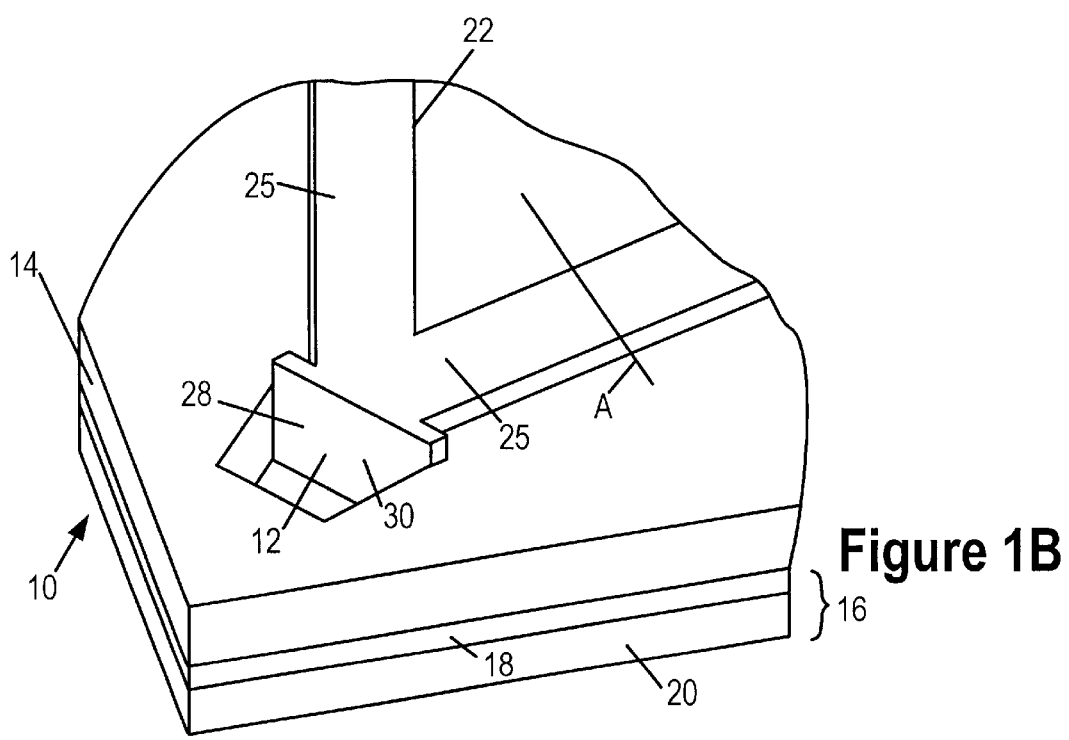
FIG. 1B is another perspective view of the component shown in FIG. 1A.
Figure 1C:
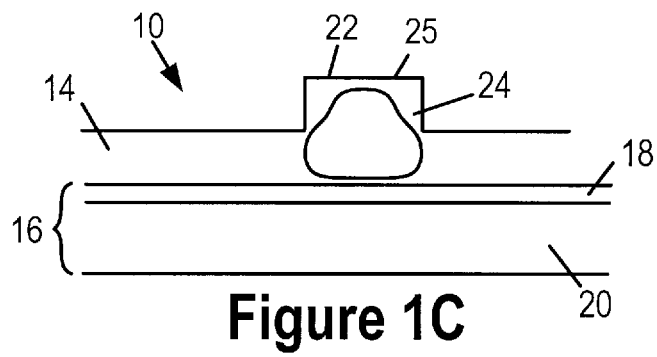
FIG. 1C is a cross section of the optical component shown in FIG. 1A and FIG. 1B.

FIG. 1A provides a perspective view of an optical component 10 having a reflecting surface 12. FIG. 1B provides, a perspective view of the optical component 10 shown in FIG. 1A taken from a different direction. FIG. 1C is a cross section of the optical component 10 shown in FIG. 1B taken at the line labeled A.

The optical component 10 includes a light transmitting medium 14 positioned adjacent to a base 16. The base 16 includes a light barrier 18 positioned adjacent to a substrate 20. The light transmitting medium 14 is formed into a ridge 22 that defines a portion of a light signal carrying region 24 of a waveguide 25. The light barrier 18 includes a material that encourages light traveling through the light signal carrying region 24 to be reflected back into the light signal carrying region 24. Accordingly, the light barrier 18 defines another portion of the light signal carrying region 24. A profile of a light signal traveling along the light signal carrying region 24 is illustrated in FIG. 1C by the arrow labeled A.

Suitable substrates 20 include, but are not limited to, silicon. Suitable light transmitting media include, but are not limited to, silicon and silica. The light barrier 18 can include a material having reflective properties such as metals. Alternatively, the light barrier 18 can have a different index of refraction than the light transmitting medium 14. For instance, the light barrier 18 can be silica or air when the light transmitting medium, 14 is silicon. The change in the index of refraction causes reflection of a portion of the light signals incident on the light barrier 18.

Figure 1D:
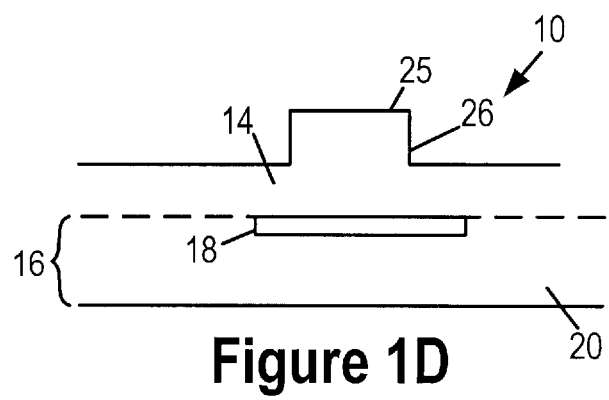
FIG. 1D illustrates a variation of the base construction.

Other constructions of the optical component 10 and the base 16 are possible. For instance, a light transmitting medium 14 can be positioned adjacent to the sides of the light barrier 18 as shown in FIG. 1D. Additional suitable component 10 constructions are shown in U.S. patent application Ser. No. 09/724,173, filed concurrently herewith, entitled "Demultiplexer Having a Compact Light Distributor" and incorporated herein in its entirety.

The ridge 22 includes one or more first sides 26 and one or more second side 28. Each first sides 26 has about the same height while having a different height than each of the second side 28. The illustrated component 10 has a plurality of first sides 26 and a single second side 28. The first side 26 and/or the second side 28 can serve as a reflecting surface 30. In the illustrated component, the second side 28 serves as a reflecting surface 12.

The reflecting surface 12 is positioned at the intersection of two waveguides 25 and is oriented such that a light signal traveling along one waveguide 25 is reflected into the other waveguide 25. Reflection results from the drop in the index of refraction that occurs at the reflecting surface 12. For instance because the air outside the waveguide 25 has an index of refraction lower than the index of refraction of the waveguide 25, light traveling along the waveguide 25 is reflected at the reflecting surface 12.

In some instances, the reflecting surface 12 is positioned so as to encourage total internal reflection. Total internal reflection can be encourage by increasing the angle between the longitude of the waveguide 25 and the reflecting surface 12.

Figure 1E:
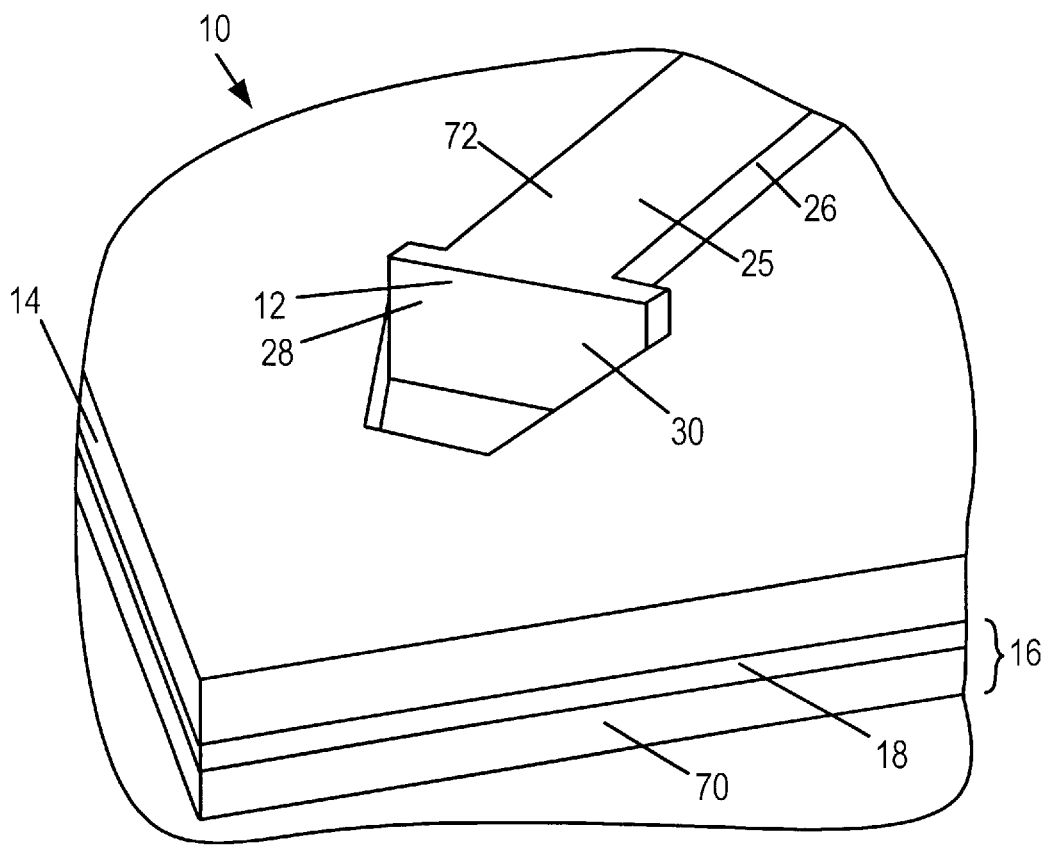
FIG. 1E illustrates a component having a reflecting surface positioned at the end of a single waveguide.

FIG. 1E provides another example of a component 10 having a reflecting surface 12. The reflecting surface 12 is positioned at an end of a waveguide 25. The reflecting surface 12 serves to reflect a light signal traveling along a waveguide 25 back into the waveguide 25.

The reflecting surfaces 12 shown above are illustrated as extending below the level of the ridge 22. As is evident from the profile illustrated in FIG. 1C, the light signals travel in the ridge 22 as well as below the ridge 22. Accordingly, extending the reflecting surface 12 below the level of the ridge 22 allows increases the portion of the light signal that is reflected above what would be reflected if the reflecting surface 12 was formed to the same point as the ridge 22. In some instances, the reflecting surface 12 extends to the base 16. In other instances, the reflecting surface 12 extends at least part way into the base 16. In still other instances, the reflecting surface 12 does not extend all the way to the base 16 and a portion of the light transmitting medium 14 is positioned between the reflecting surface 12 and the base 16.

The portion of the reflecting surface 12 located below the ridge 22 has a width greater than the width of the ridge 22. As evident from the profile shown in FIG. 1C, the light signal carrying region 24 expands below the ridge 22. The reflecting surface 12 is preferably sized so as to intersect the entire light signal carrying region 24 in order to increase the portion of the light signal reflected by the reflecting surface 12. As a result the portion of the reflecting surface 12 below the ridge 22 is wider than the ridge 22. Because the reflecting surface 12 can be formed from a single etch, the reflecting surface 12 has the same width above and below the ridge 2. As a result, a flange 30 is formed at the end of each waveguide 25.

Figure 2A:
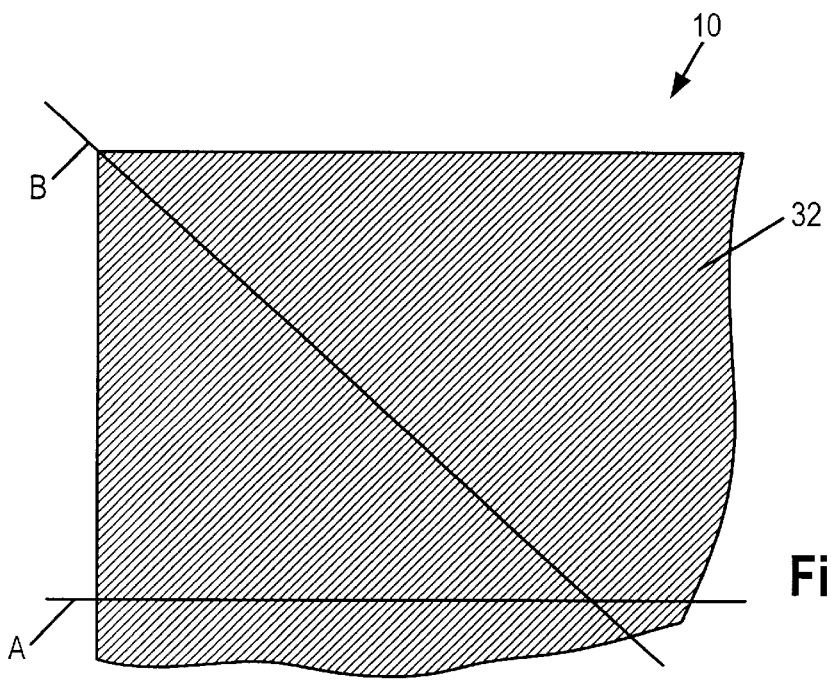
FIG. 2A through FIG. 8C illustrate a method of forming a waveguide having sides with different heights.
Figure 2B:
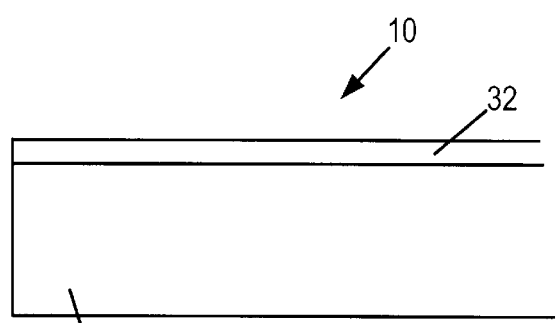
Figure 2C:
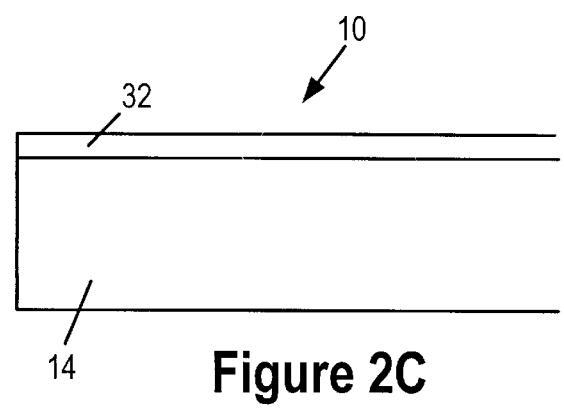

FIG. 2A through FIG. 8C illustrate a method of forming an optical component 10 having a reflecting surface 12. FIG. 2A is a topview of an optical component 10. FIG. 2B is a cross section of the component 10 shown in FIG. 2A taken along the line labeled A and FIG. 2C is a cross section of the component 10 shown in FIG. 2A taken along the line labeled B. The light transmitting medium 14 is illustrated without the base 16. A material 32 for formation of a mask is formed over the light transmitting medium 14. A suitable mask includes, but is not limited to, a hard mask. Examples of a hard mask include, but are not limited to, $SiO_2$ when the light transmitting medium is silicon and SiN or polysilicon when the light transmitting medium is silica. $SiO_2$ can be grown to a thickness of about 1 $\mu$m to 200 nm by employing thermal oxide or LPCVD TEOS deposition techniques.

Figure 3A:
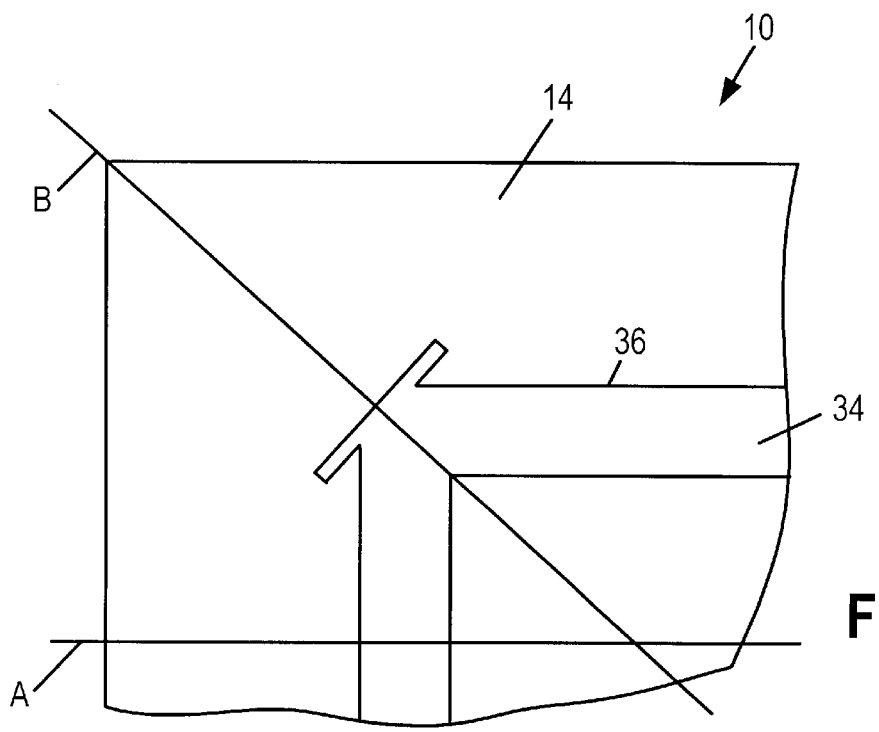
Figure 3B:
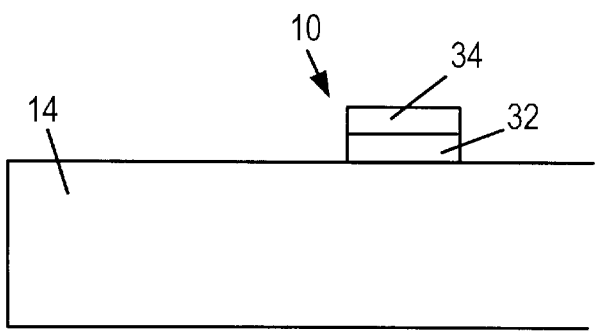
Figure 3C:
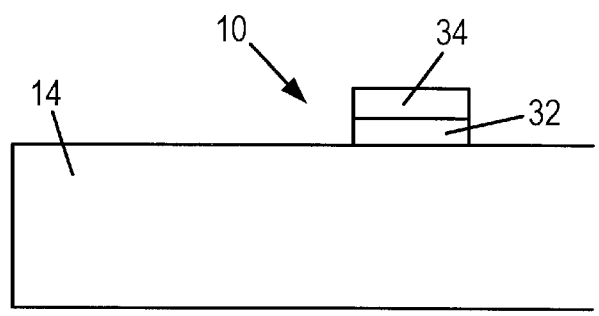

A mask definition layer 34 is formed on the mask material 32 as shown in FIG. 3A through FIG. 3C. FIG. 2A is a topview of the optical component 10. FIG. 3B is a cross section of the component 10 shown in FIG. 3A taken along the line labeled A and FIG. 3C is a cross section of the component 10 shown in FIG. 3A taken along the line labeled B. The mask definition layer 34 is formed over a ridge region 36 of the light transmitting medium 14. The ridge region 36 is the region of the light transmitting medium 14 where a ridge of a waveguide 25 is to be formed. A suitable mask definition layer 34 is a photoresist applied using photolithography printing equipment such as a contact aligner or a stepper. The mask material 32 is etched after formation of the mask definition layer 34. The etch is performed so as to remove the exposed regions of the mask material 32 from the component 10. Accordingly, the etch exposes a portion of the light transmitting medium 14 as shown in FIG. 3A through FIG. 3C. A suitable etch includes, but is not limited to, a reactive ion etch.

Figure 4A:
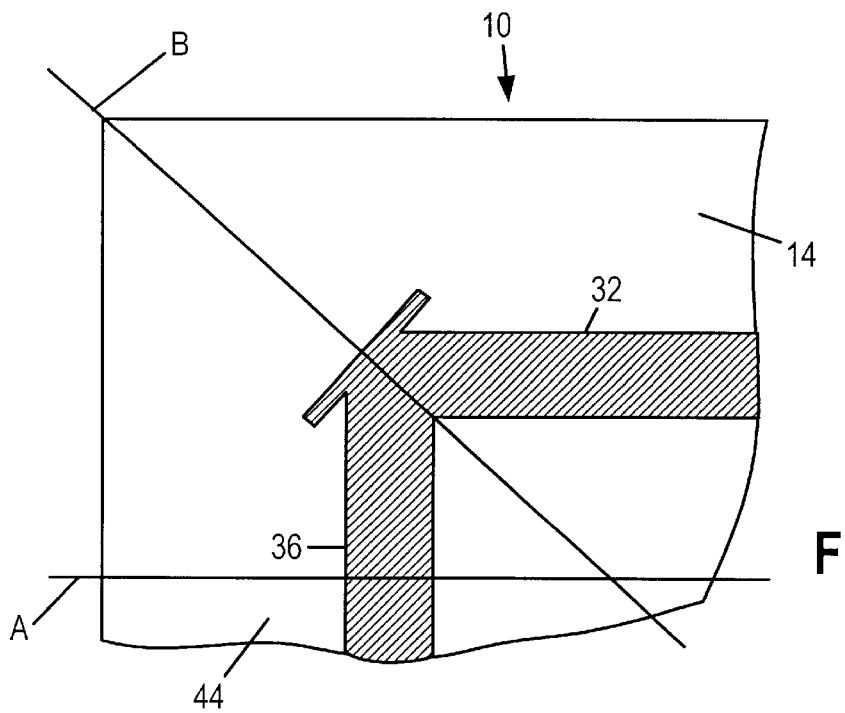
Figure 4B:
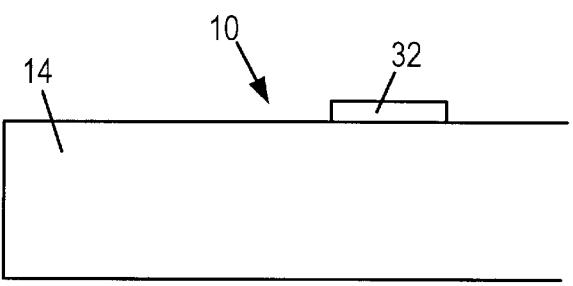
Figure 4C:
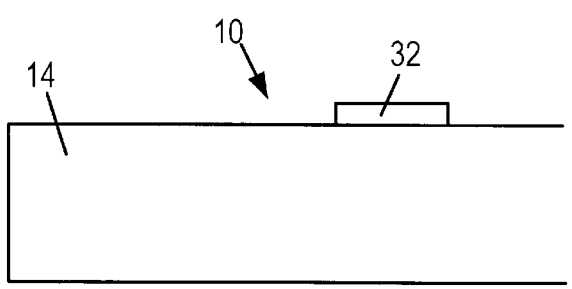

The mask definition layer 34 is stripped to provide the component 10 illustrated in FIG. 4A through FIG. 4C. FIG. 4A is a topview of the optical component 10. FIG. 4B is a cross section of the component 10 shown in FIG. 4A taken along the line labeled A and FIG. 4C is a cross section of the component 10 shown in FIG. 4A taken along the line labeled B.

Figure 5A:
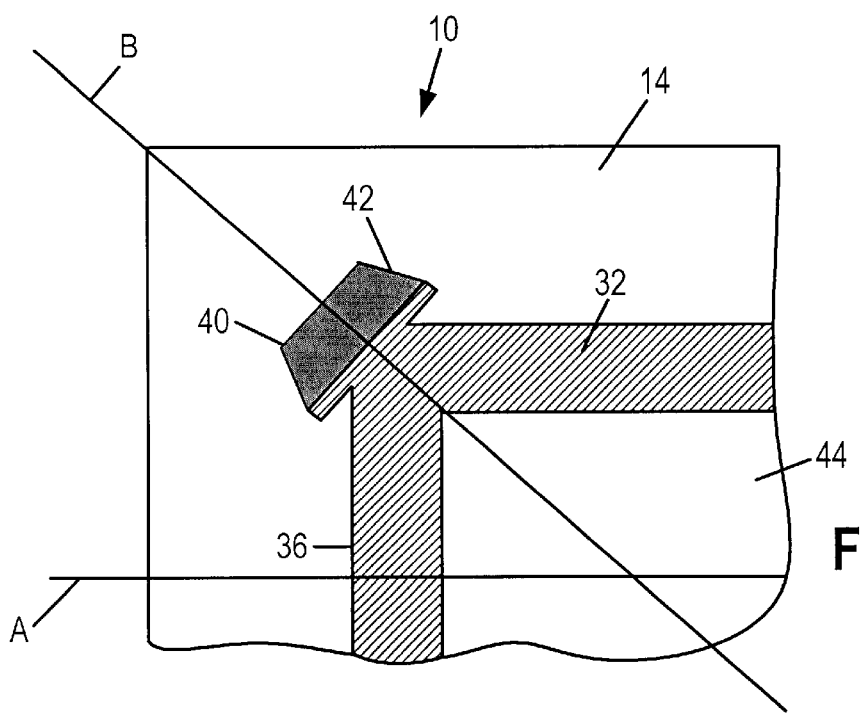
Figure 5B:
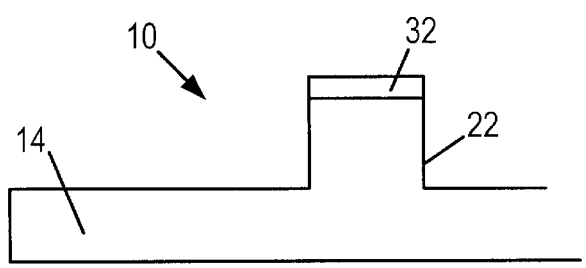
Figure 5C:
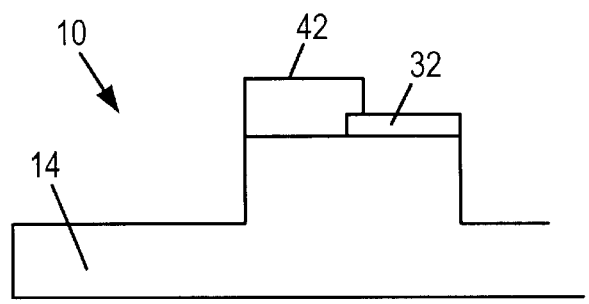

A second region 40 of the light transmitting medium 14 is protected as shown, in FIG. 5A through FIG. 5C. FIG. 5A is a topview of the optical component 10. FIG. 5B is a cross section of the component 10 shown in FIG. 5A taken along the line labeled A and FIG. 5C is a cross section of the component 10 shown in FIG. 5A taken along the line labeled B. The second region 40 is positioned adjacent to a portion of the light transmitting medium 14 having a second side 28 of the ridge 22. The second region 40 can be protected by forming a second mask 42 over the second region 40. As illustrated, a portion of the second mask 42 can overlap the first mask in order to protect the intersection of the first mask and the second mask 42. A suitable second mask 42 includes, but is not limited to, a photoresist formed using photolithography printing equipment such as a contact aligner or a stepper.

A first etch of the light transmitting medium 14 is performed after the second region 40 of the light transmitting medium 14 is protected. The first etch results in formation of at least a portion of the first side 26. The first mask serves to define the location and profile of the portion of the first side 26 formed during the first etch. The height of the first sides 26 results from the duration of the first etch. A longer duration provides a taller first side 26. The first etch is preferably performed so as to provide a smooth first side 26. A suitable etch includes, but is not limited to a reactive ion etch, an etch according to the Bosch process. Additionally, the methods discussed in U.S. patent application Ser. No. 09/690,959, filed on Oct. 16, 2000, entitled Formation of a Smooth Vertical Surface on an Optical Component and incorporated herein in its entirety can also be employed to etch the first side 26.

Figure 6A:
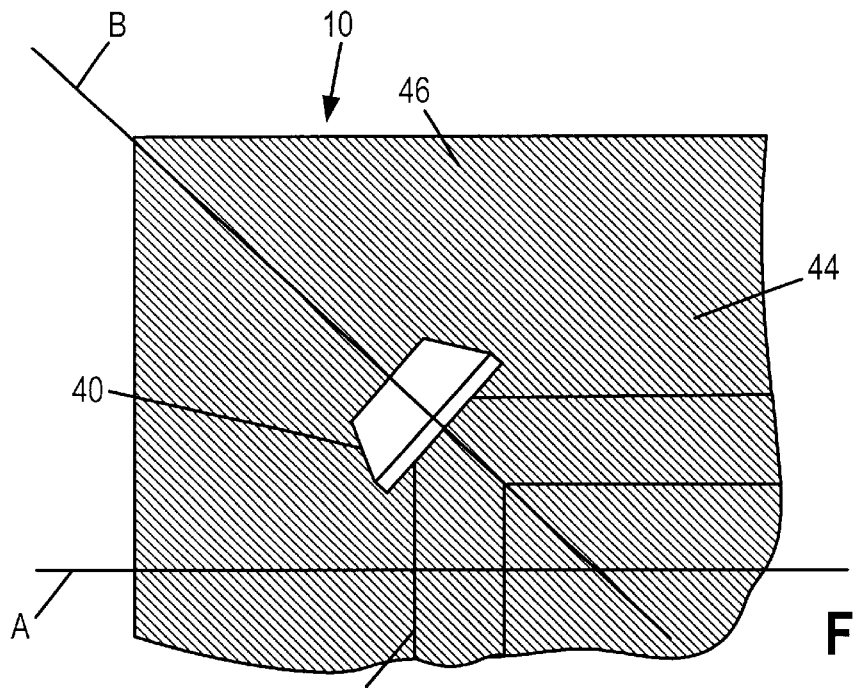
Figure 6B:
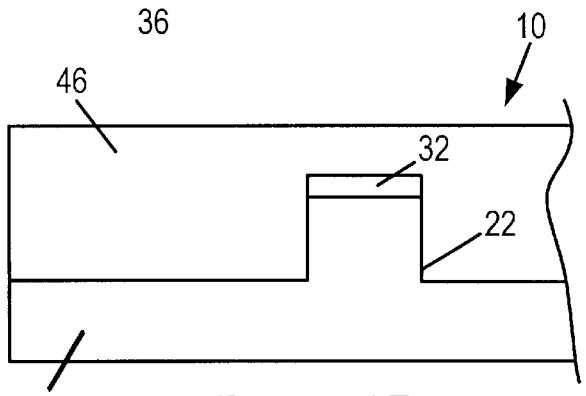
Figure 6C:
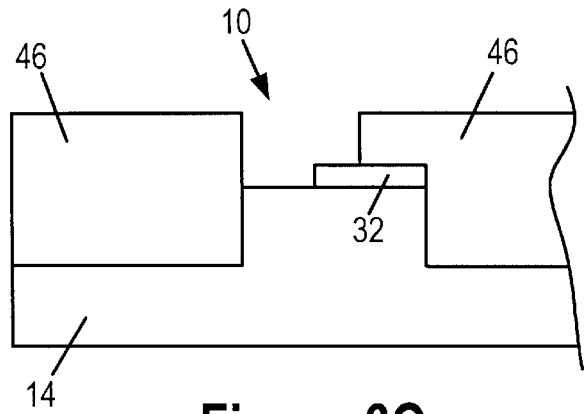

The second mask 42 is removed and a first region 44 of the light transmitting medium 14 protected as illustrated in FIG. 6A through FIG. 6C. FIG. 6A is a topview of the optical component 10. FIG. 6B is a cross section of the component 10 shown in FIG. 6A taken along the line labeled A and FIG. 6C is a cross section of the component 10 shown in FIG. 6A taken along the line labeled B. The first region 44 is positioned adjacent to the portion of the light transmitting medium 14 having a first side 26 of the ridge 22. The first region 44 can be protected by forming a third mask 46 over the first region 44. The third mask 46 can also be formed over the ridge region 36 and the first mask. A portion of the first mask adjacent to the second region 40 remains exposed as is evident in FIG. 5C. A suitable third mask 46 includes, but is not limited to, a planerized photoresist applied using photolithography printing equipment such as a contact aligner or a stepper.

A second etch of the light transmitting medium 14 is performed after the first region 44 of the light transmitting medium 14 is protected. The second etch results in formation of the second side 28. Because the portion of the first mask adjacent to the second region 40 remains exposed, the first mask serves to define the location and profile of second side 28. As a result, the first mask serves to define the location and profile of both the first sides 26 and the second sides 28. Because the first mask serves to define the second side 28 and the portion of the second side 28 below the ridge 22 is wider than the ridge 22 in order to increase the portion of the light signal received by the second side 28, the first mask extends beyond the width of the ridge 22. The portion of the first mask extending beyond the ridge 22 causes the flange 30 around the end of the waveguides 25 to be formed.

Because the second side 28 is formed independent of the first side 26, the second side 28 can be formed with a different height than the first side. As noted above, when the second side 28 is a reflecting surface 12, the second side 28 can reflect a larger portion of the light signals when the second surface extends further into the light transmitting medium 14, i.e. when the second surface extends closer to the base 16 than the first surface. Accordingly, the second etch can be performed so as to form a second surface that extends all the way to the base 16. Additionally the second etch can be performed so all or a portion of the light barrier 18 is etched. In some instances, the second etch is performed so a portion of the substrate 20 is also etched. In other instances, the second etch is performed so the second side 28 does not extend all the way to the base 16.

The second etch is preferably performed so as to provide a smooth second side 28. A suitable second etch includes, but is not limited to a reactive ion etch, an etch according to the Bosch process. Additionally, the methods discussed in U.S. patent application Ser. No. 09/690,959, filed on Oct. 16, 2000, entitled Formation of a Smooth Vertical Surface on an Optical Component and incorporated herein in its entirety can also be employed to etch the second side 28. The second etch need not be the same as the first etch although it can be.

Figure 7A:
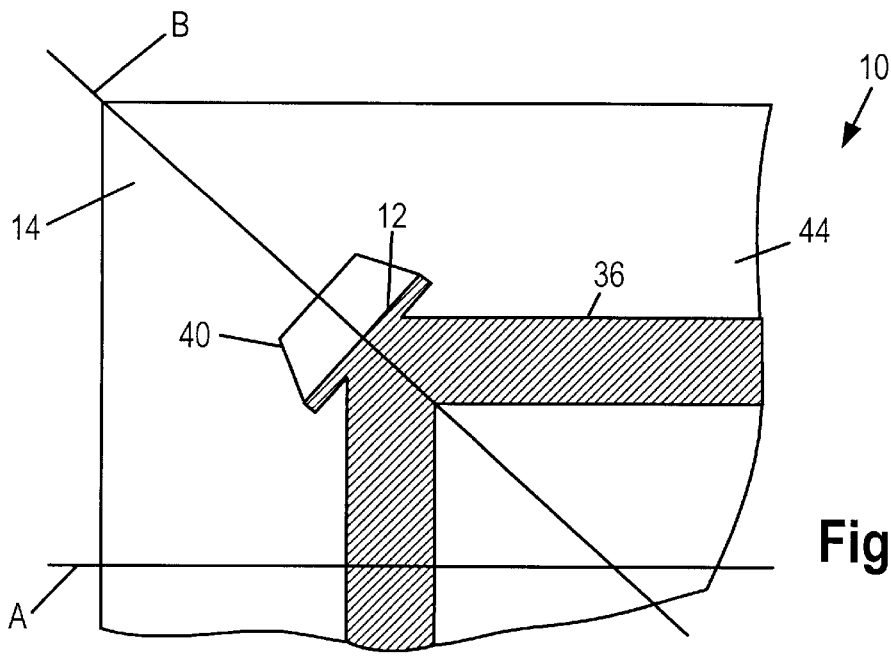
Figure 7B:
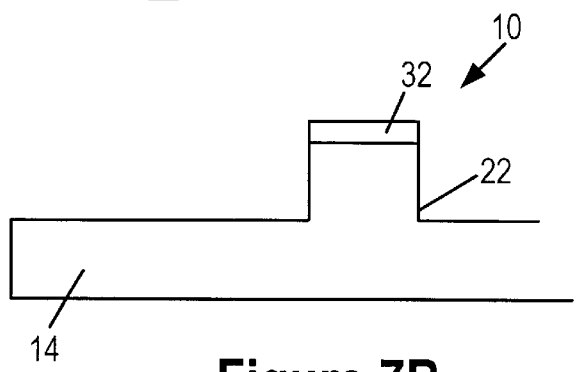
Figure 7C:
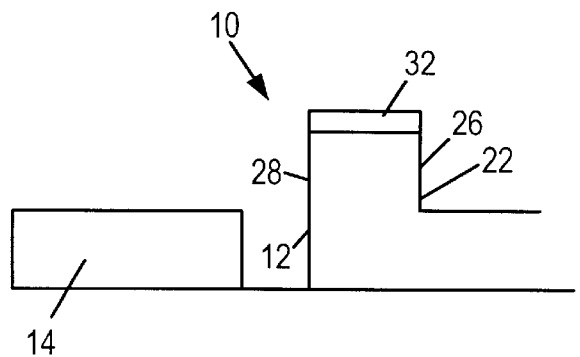

The third mask 46 is stripped to provide the component 10 shown in FIG. 7A through FIG. 7C. FIG. 7A is a topview of the optical component 10. FIG. 7B is a cross section of the component 10 shown in FIG. 7A taken along the line labeled A and FIG. 7C is a cross section of the component 10 shown in FIG. 7A taken along the line labeled B.

Figure 8A:
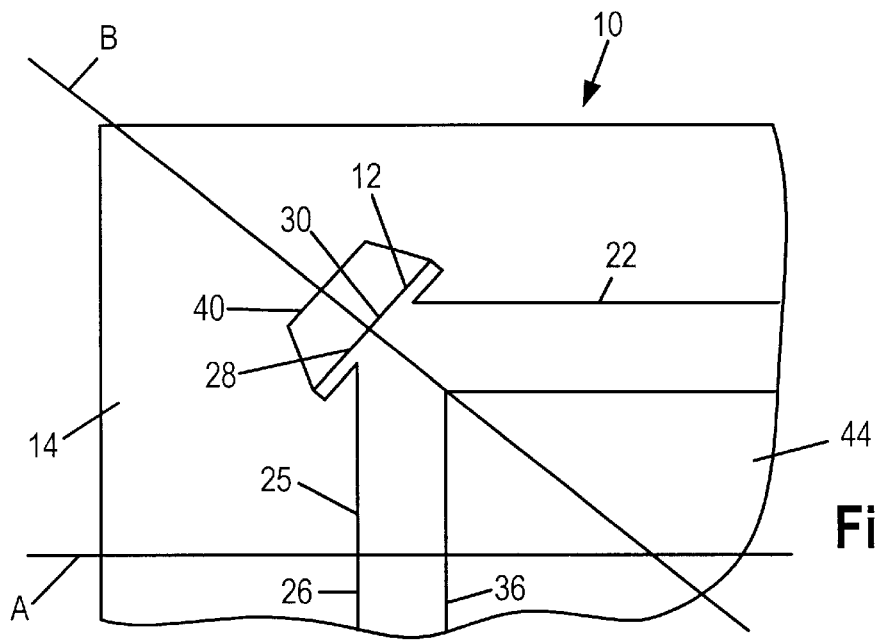
Figure 8B:
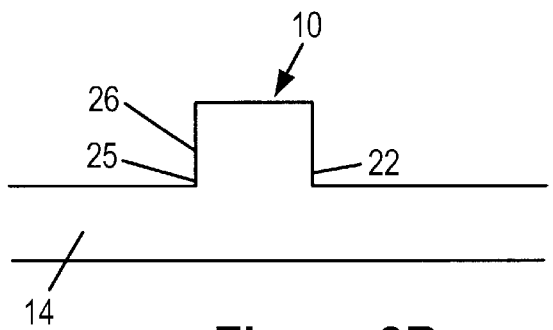
Figure 8C:
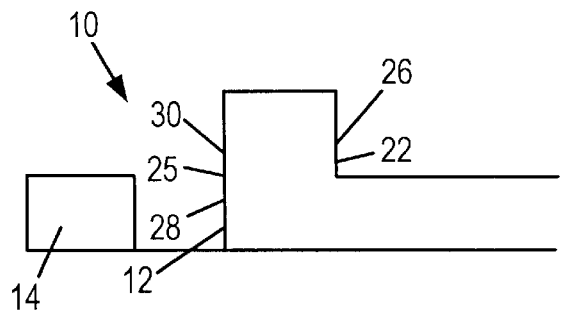

The first mask is stripped to provide the component 10 shown in FIG. 8A through FIG. 8C. FIG. 8A is a topview of the optical component 10. FIG. 8B is a cross section of the component 10 shown in FIG. 8A taken along the line labeled A and FIG. 8C is a crosssection of the component 10 shown in FIG. 8A taken along the line labeled B. The third mask 46 and the first mask can be concurrently stripped or the first or they can be sequentially stripped as is illustrate.

Figure 9A:
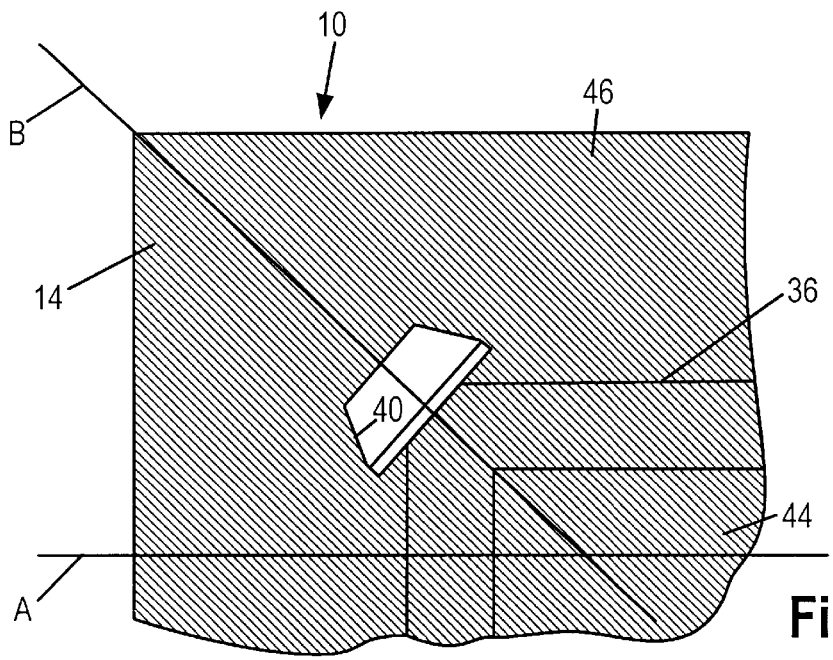
FIG. 9A through FIG. 13C illustrate another embodiment of a method of forming a waveguide having sides with different heights.
Figure 9B:
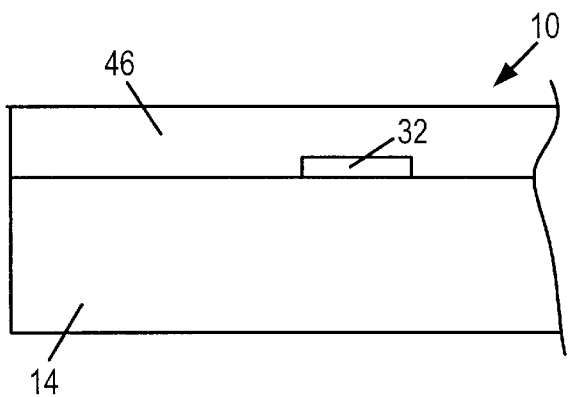
Figure 9C:
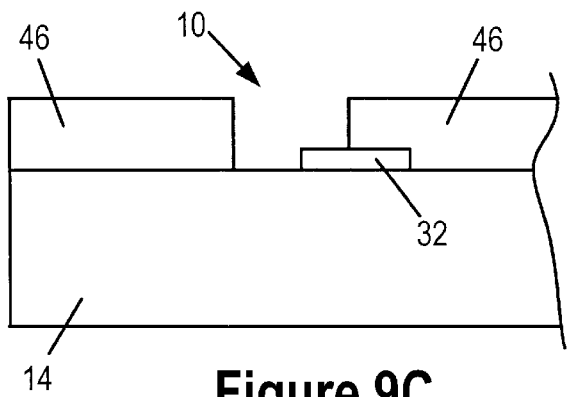

FIG. 9A through FIG. 13C illustrate an embodiment of the method where the second etch is performed before the first etch. The first region 44 of the component 10 of FIG. 4A through FIG. 4C is protected with the third mask 46 as shown in FIG. 9A through FIG. 9C. FIG. 9A is a topview of the optical component 10. FIG. 9B is a cross section of the component 10 shown in FIG. 9A taken along the line labeled A and FIG. 9C is a cross section of the component 10 shown in FIG. 9A taken along the line labeled B. The second region 40 remains exposed. As is evident from FIG. 9C, the third mask 46 is formed over the first mask such that a region of the first mask that is positioned adjacent to the second region 40 remains exposed.

Figure 10A:
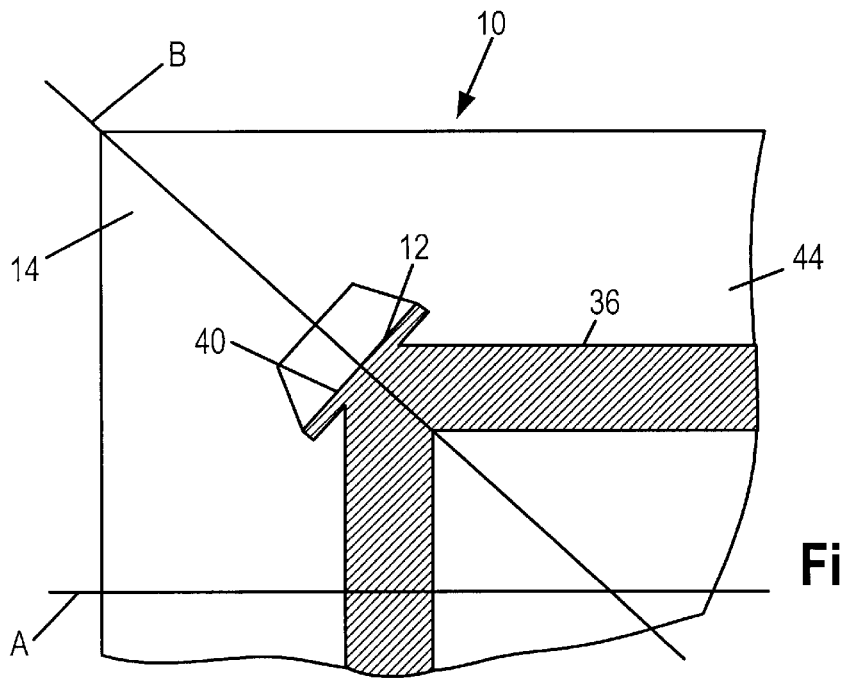
Figure 10B:
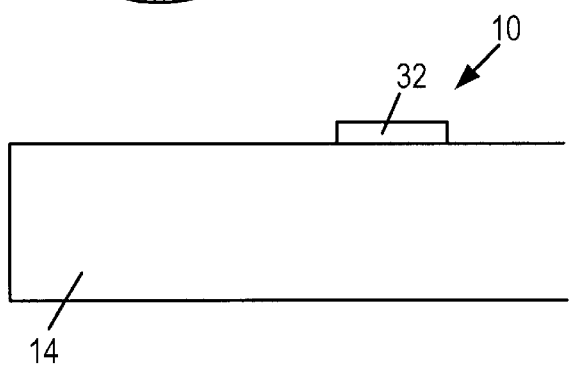
Figure 10C:
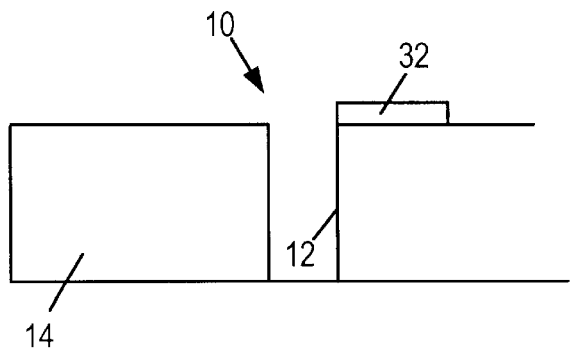

The second etch is performed so as to form the second side 28 as shown in FIG. 10A. through 10C. FIG. 10A is a topview of the optical component 10. FIG. 10B is a cross section of the component 10 shown in FIG. 10A taken along the line labeled A and FIG. 10C is a cross section of the component 10 shown in FIG. 10A taken along the line labeled B. The exposed portion of the first mask serves to define the profile of the second side 28 during the second etch. The third mask 46 is stripped from the component 10 while leaving the first mask substantially intact.

Figure 11A:
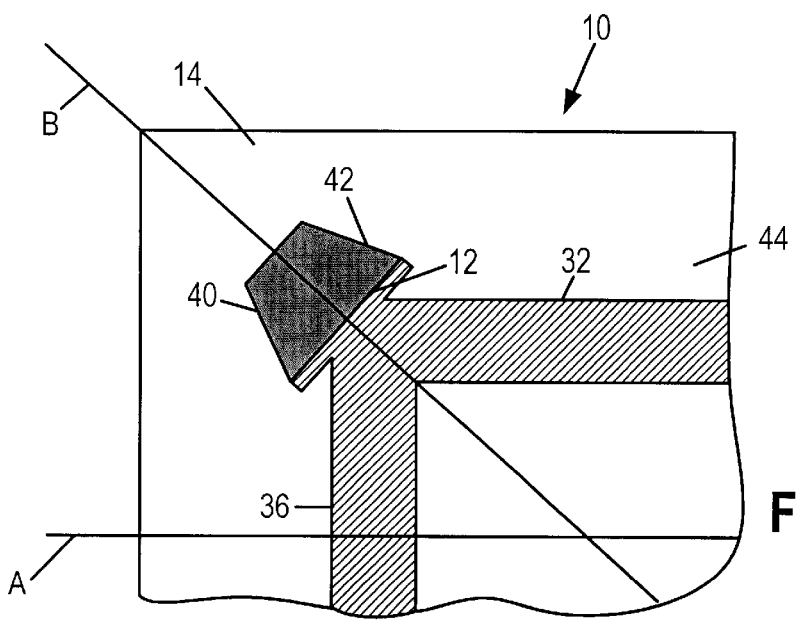
Figure 11B:
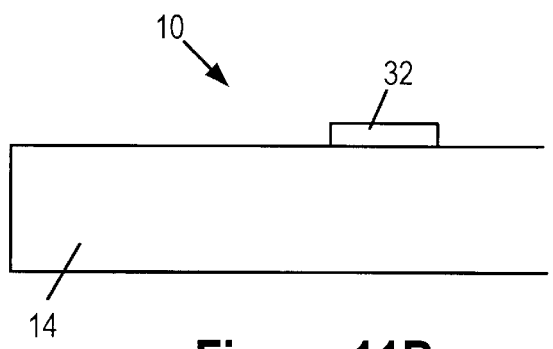
Figure 11C:
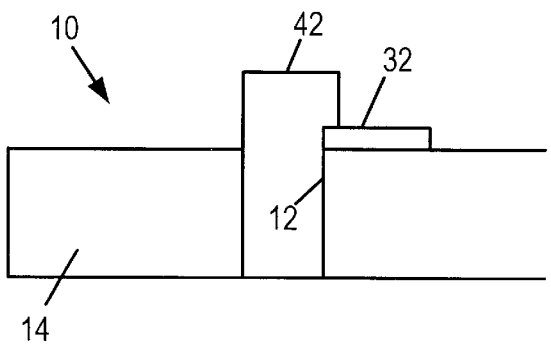

The second region 40 is protected with the second mask 42 as shown in FIG. 11A through FIG. 11C. FIG. 11A is a topview of the component 10. FIG. 11B is a cross section of the component 10 shown in FIG. 11A taken along the line labeled A and FIG. 1C is a cross section of the component 10 shown in FIG. 11A taken along the line labeled B.

Figure 12A:
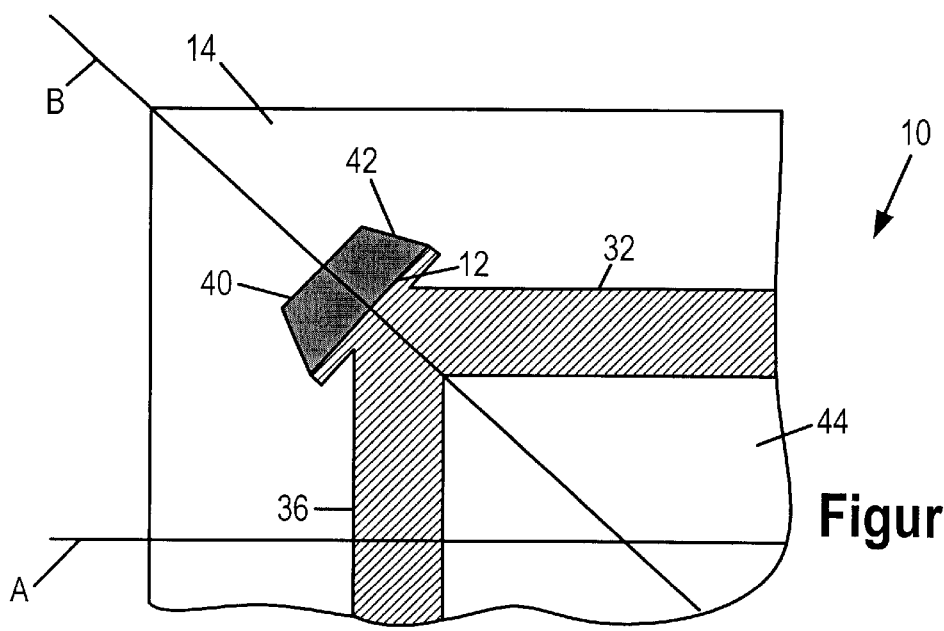
Figure 12B:
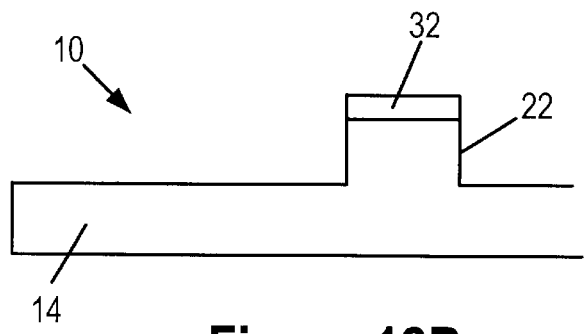
Figure 12C:
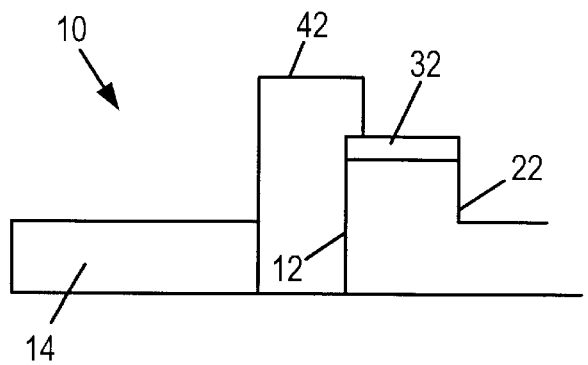

The first etch is performed so as to form the first side 26 as shown in FIG. 12A through 12C. FIG. 12A is a top view of the optical component 10. FIG. 12B is a cross section of the component 10 shown in FIG. 12A taken along the line labeled A and FIG. 12C is across section of the component 10 shown in FIG. 12A taken along the line labeled B. The first mask serves to define the profile of the first side 26 during the first etch.

Figure 13A:
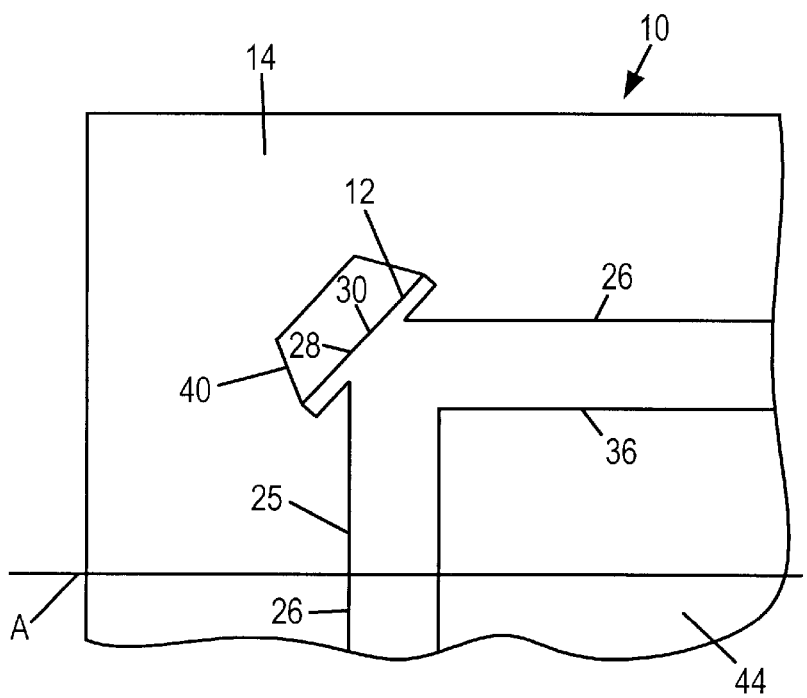
Figure 13B:
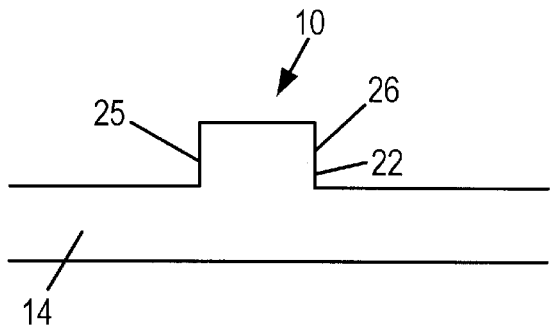
Figure 13C:
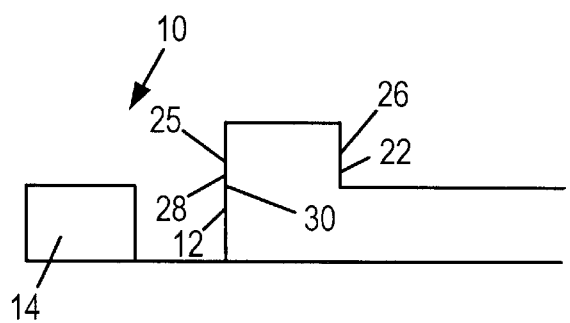

The first mask and the second mask 42 are stripped from the component 10 to provide the component 10 shown in FIG. 13A through FIG. 13C. FIG. 13A is a topview of the component 10. FIG. 13B is a cross section of the component 10 shown in FIG. 13A taken along the line labeled A and FIG. 13C is a cross section of the component 10 shown in FIG. 13A taken along the line labeled B.

Figure 14B:
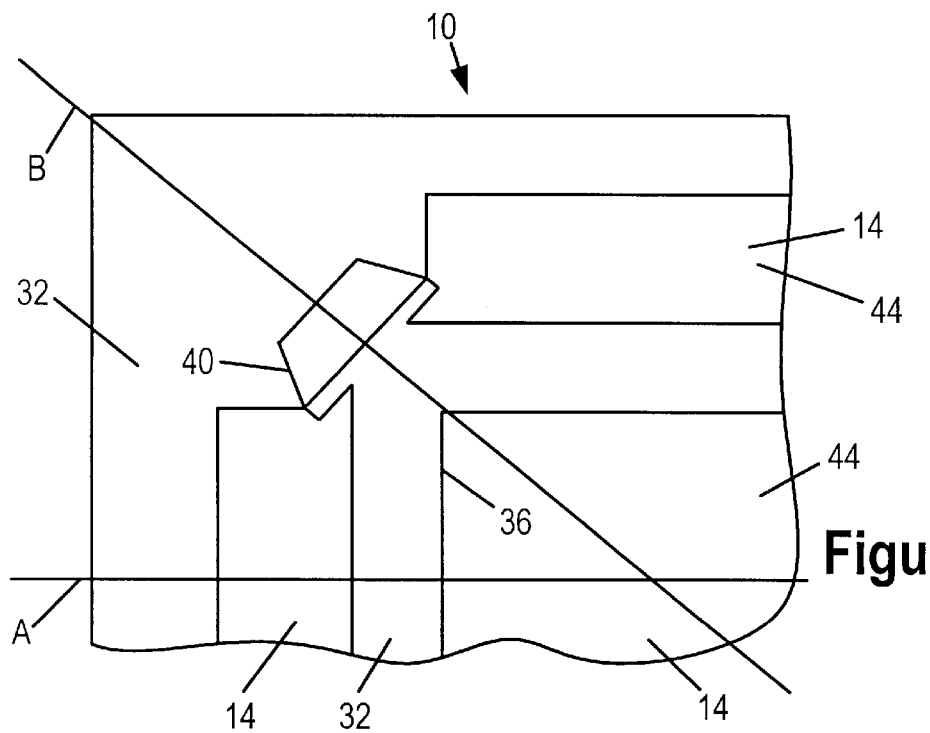
FIG. 14A through FIG. 14C illustrate a variation of the methods shown in FIG. 2A through FIG. 13C.
Figure 14A:
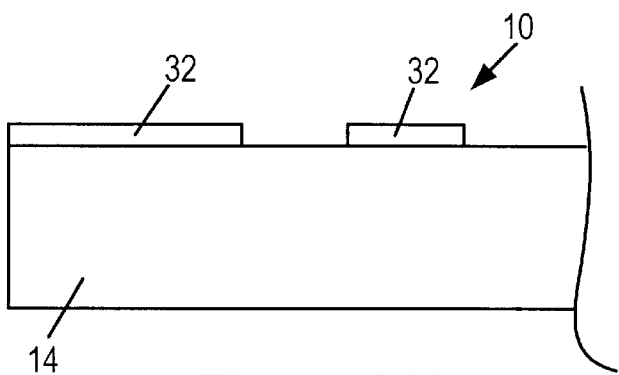
Figure 14C:
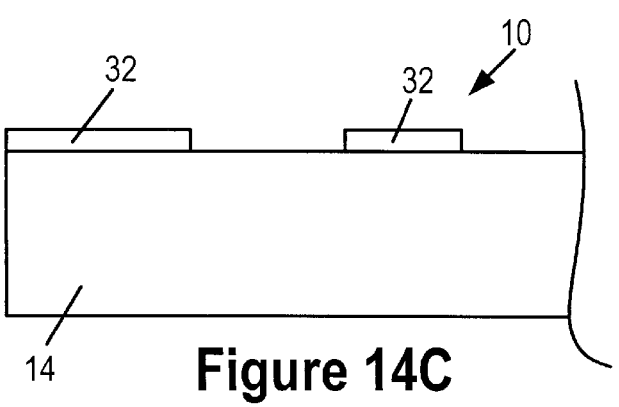

The first mask formed in FIG. 2A through FIG. 4C can be formed over regions of the component 10 that are remote from the first side 26 and the second side 28 of the ridge 22 as illustrated in FIG. 14A through FIG. 14C. This configuration can be altered to optimize the cost and efficiency of the mask formation methods as well as the etch processes.

Figure 15:
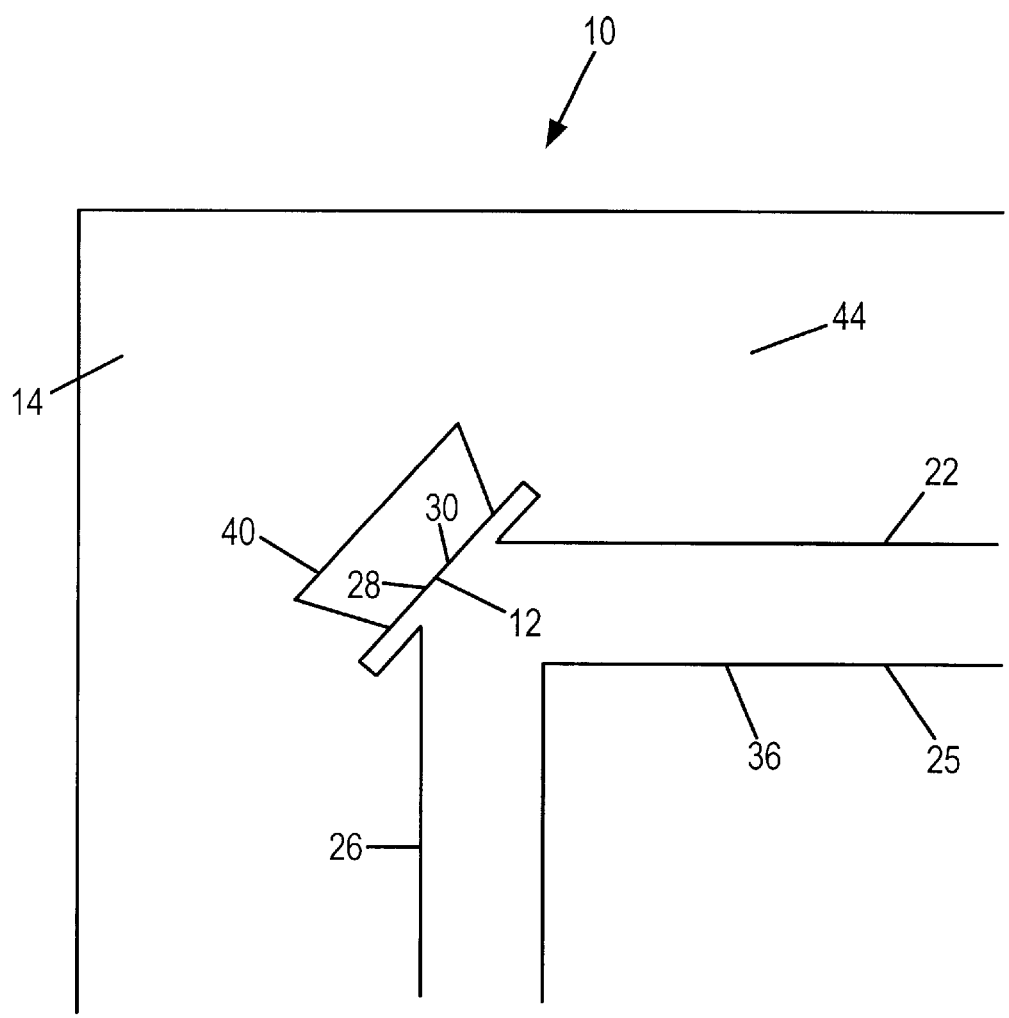
FIG. 15 illustrates yet another variation of the methods shown in FIG. 2A through FIG. 13C.

The second region 40 can have shapes other than the shape shown in FIG. 1A. For instance, the second region 40 can expand when moving away from the waveguide 25. This configuration expands the angles of the corners of the second region that include the reflecting surface as shown in FIG. 15. Increasing these angles allows chemicals employed and/or generated during etch processes to more easily flow in and/or out of the corners so the etch rate in the corners is substantially the same as the etch rate in the second region. Although not illustrated in FIG. 15, the sides of the second region 40 preferably intersect the ends of the sides of the second side 28 in order to maximize the size of the second side 28 and accordingly maximize the portion of the light signal reflected by the reflecting surface 12.

When the second side 28 and/or the first side 26 are reflecting surfaces 12, a reflecting material, such as a metal, can be formed on the first side 26 and/or the second side 28. When the first side 26 and/or the second side 28 are configured to transmit light signals, an anti-reflecting material can be formed on the first side 26 and/or the second side 28.

Although the above method is directed toward formation of a reflecting surface 12, the method is not limited to formation of reflecting surfaces 12. For instance, the method can also be employed to form a first side 26 of a waveguide 25 and a second side 28 of a waveuide such that the first side 26 and the second side 28 have different heights. Neither the first side 26 not the second side 28 need be reflecting surfaces 12.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of forming a an optical component, comprising:

performing a first etch of the optical component so as to form a first side of a ridge on the optical component, a first mask defining a profile of the first side during the first etch; and performing a second etch of the optical component so as to form a second side of the ridge, the first mask defining a profile of the second side during the second etch.

2. The method of claim 1, wherein the second etch is performed before the first etch.

3. The method of claim 1, wherein the second side is taller than the first side.

4. The method of claim 1, wherein the second etch is deeper than the first etch.

5. The method of claim 1, wherein the optical component includes a light transmitting medium adjacent to a base and the second side is formed so as to be closer to the base than the first side.

6. The method of claim 5, wherein the second side extends all the way to the base.

7. The method of claim 5, wherein the second side extends through the light transmitting medium and penetrates into the base.

8. The method of claim 1, further comprising:

protecting a second region of the optical component before performing the first etch, the second region being adjacent to the first mask where the second side of the ridge is to be formed.

9. The method of claim 8, wherein protecting the second region includes forming a second mask over the second region.

10. The method of claim 9, wherein the second mask is a photoresist.

11. The method of claim 9, further comprising:

removing the second mask while leaving the first mask substantially intact before performing the second etch.

12. The method of claim 1, wherein the first mask is $SiO_2$.

13. The method of claim 1, wherein a first region of the optical component is protected while a second region of the optical component remains exposed during the second etch, the first region being adjacent to the first side of the ridge and the second region being adjacent to the region of the optical component where the second side is to be formed.

14. The method of claim 13, wherein protecting a first region of the optical component includes forming a third mask over the first region of the optical component, the third mask being positioned over at least a portion of the first mask.

15. The method of claim 14, wherein the third mask is formed such that a portion of the first mask positioned adjacent to the region of the optical component where the second side is to be formed extends from under the third mask.

16. The method of claim 14, wherein the third mask is a photoresist.

17. The method of claim 14, wherein performing the second etch includes removing the third mask while leaving the first mask substantially intact.

18. The method of claim 1, wherein the ridge is the ridge of one or more ridge waveguides.

19. The method of claim 18, wherein the second side is positioned at the intersection of two ridge waveguides.

20. The method of claim 19, wherein the second side is positioned so as to reflect a light signal traveling along one waveguide into another waveguide.

21. The method of claim 19, wherein the second side is substantially vertical.

22. The method of claim 19, wherein the first side is substantially vertical.

23. The method of claim 9, wherein a portion of the second mask overlaps a portion of the first mask.

* * * * *

UNITED STATES PATENT AND TRADEMARK OFFICE
CERTIFICATE OF CORRECTION

PATENT NO. : 6,563,997 B1
DATED : May 13, 2003
INVENTOR(S) : Wu et al.

It is certified that error appears in the above-identified patent and that said Letters Patent is hereby corrected as shown below:

<u>Title page,</u>
Item [73], Assignee, please delete the word "Lighteross" and replace it with
-- Lightcross --.
Item [74], *Attorney, Agent or Firm*, please delete "P.S." and replace it with -- P.C. --.

Signed and Sealed this

Twenty-sixth Day of August, 2003

JAMES E. ROGAN
*Director of the United States Patent and Trademark Office*